No. 816,986.
PATENTED APR. 3, 1906.
M. C. MACHADO.
SIDEHILL HARROW DRAFT ATTACHMENT.
APPLICATION FILED MAR. 15, 1905.
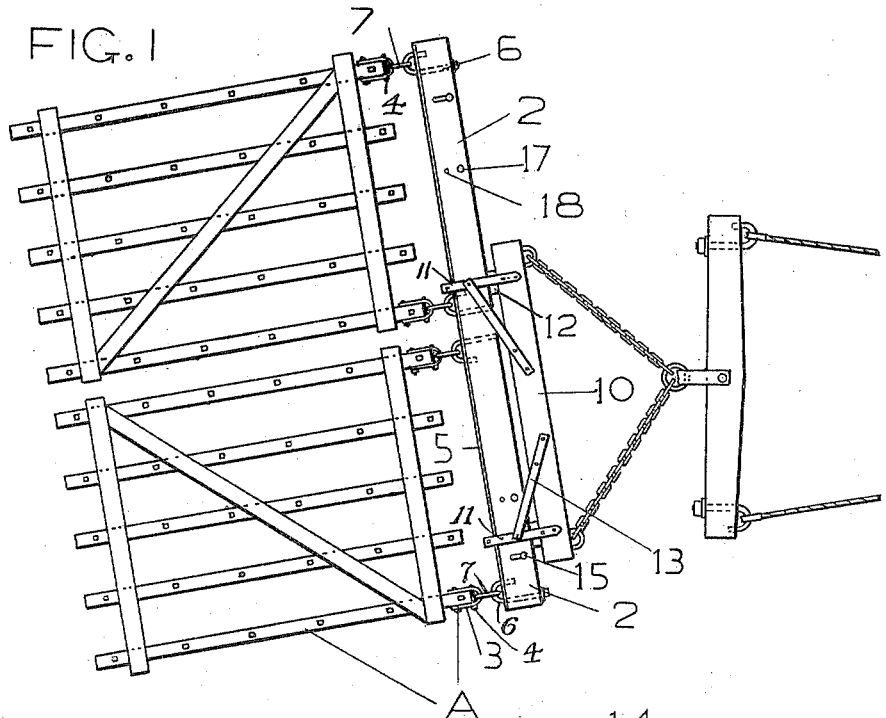
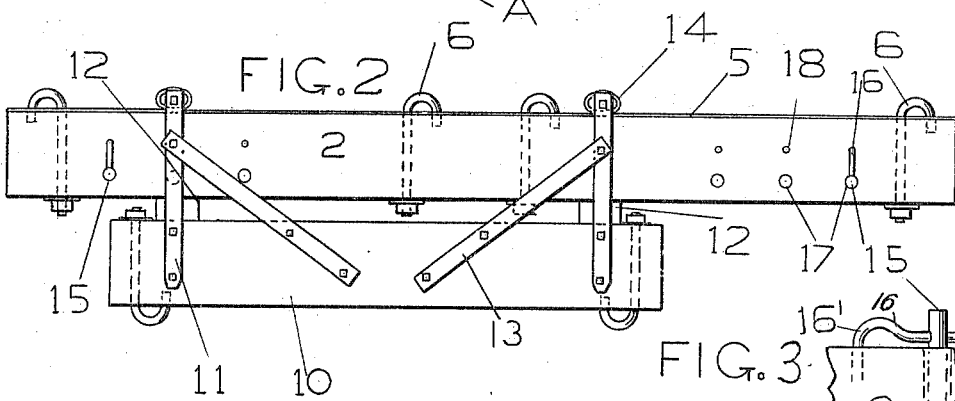
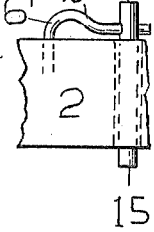
Witnesses
Inventor
Manuel C. Machado
By Geo. H. Strong, Attorney

UNITED STATES PATENT OFFICE.

MANUEL C. MACHADO, OF MORRO, CALIFORNIA, ASSIGNOR OF ONE-HALF TO A. H. FROOM, OF SANTA MARIA, CALIFORNIA.

SIDEHILL-HARROW DRAFT ATTACHMENT.

No. 816,986.      Specification of Letters Patent.      Patented April 3, 1906.

Application filed March 15, 1905. Serial No. 250,160.

*To all whom it may concern:*

Be it known that I, MANUEL C. MACHADO, a citizen of the United States, residing at Morro, in the county of San Luis Obispo and State of California, have invented new and useful Improvements in Sidehill-Harrow Draft Attachments, of which the following is a specification.

My invention relates to harrows which are particularly designed for use on side hills where the tendency of the harrow is generally to run downhill to cause the teeth to track in such a way as to leave unharrowed land between the rows of teeth and for the draft on the team to be abnormally increased.

The common trouble with sidehill-harrowing is that if the point of attachment of the team or other draft means to the harrow is all right to harrow across the hill in one direction it will not be all right when the team is turned to go in the other direction, owing to the tendency above noted of the harrow to run downhill. With draft appliances commonly in use it necessitates a man going in behind the team and in front of the harrow to make any adjustment to bring the draft below the center to produce an equally good result in going either way across the hill. This takes time, besides being with a fractious team a most dangerous proceeding.

The main object of my invention is to provide a draft appliance which will automatically adjust itself to maintain the harrow-teeth at a uniform pitch relative to the line of draft, so as to produce the best results irrespective of the direction of travel.

Another object is to provide a means for overcoming the tendency of the front of the harrow catching on top of and riding on the draft-bar when a corner is turned, and so lifting the forward end of the harrow out of the ground and causing the rear to dig too deeply into the soil.

The invention consists of the parts and the construction and combination of parts, as hereinafter more fully described and claimed, having reference to the accompanying drawings, in which—

Figure 1 is a plan view of harrow and attachment, showing working position. Fig. 2 is a plan of the draft-bar and sliding bar. Fig. 3 is a detail of a stop-pin.

A represents a harrow of ordinary construction commonly having two hinged sections, each composed of suitably-braced timbers running fore and aft and provided with the usual teeth.

2 is a draft-bar extending across the front of the harrow and attached to the front of each harrow-section in such a manner as to allow the necessary swivel connection between the bar and harrow.

As here shown, I employ at each corner at the front end of each harrow-section a spring-clamp consisting of a U-shaped clevis 3, pivoted horizontally instead of vertically in the harrow-frame and adapted to swing over the end of a beam of the frame and assume different angles relative to a horizontal plane. A bolt 4 is passed through the clevis so as just to clear the end of the frame-beam, but acting when tightened to cause the sides of the clevis to grip the end of the beam clamp-like and keep the clevis at the same angle. The rear side of the bar 2 is provided with a protective buffer-plate 5 and an eyebolt 6 relative to each clevis 3 and a hook 7.

In order to provide for maintaining the harrow against running downhill, I employ a bar 10, adapted to have an adjustable limited sliding movement lengthwise of the draft-bar 2.

As shown, the slide-bar 10 carries a bracket 11 at each end, extending rearward and embracing the bar 2, spaced therefrom by the blocks 12, braced against lateral strain by the straps 13, and having the reversible elliptical bearings 14 on the back of bar 2. The blocks 12 are for the purpose of keeping the bars far enough apart so that neither will be worn by the projecting nuts or bolts on the other. The bearings 14 are made in the shape shown to enable them to be turned over when one side has become worn too flat or too thin.

The movement of the side bar on bar 2 is regulated and limited by the pins 15 having irregularly-curved stop projections 16 fitting corresponding perforations 17 18, arranged on each side of the center of bar 2. The pins 15 go clear through the perforations 17, so as to afford a substantial stop above and below the bar 2 to the brackets 11. The projections 16 each extend out to one side from near the upper end of a pin 15 and then curve upward and down again to form a loop portion 16', standing above the surface of the bar 2, when the vertical straight portion of the pin is driven into its hole 18, the loop 16' being adapted to receive a jaw of a monkey-wrench or other suitable instrument when it is desired to withdraw and shift the pin. The projections 16 keep the pins from turning and hold them in fixed position. At the same time they enable the ready removal of the pins from one set of holes and their insertion into other holes when it is desired to shift the draft.

When harrowing on a side hill, a harrow is made to run up or down hill according as the point of attachment of the draft is more or less to the lower side of the center of the harrow. If the team is hitched above the center, the harrow will naturally gravitate downhill, since the weight on the lower side of the point of attachment of the draft is greater than above. To maintain the proper pitch of the harrow-teeth, the draft must be shifted more or less below the center to leave more weight above the center, whereupon the teeth acting rudder-like on the soil will tend to run the harrow uphill. This tendency of course is modified by gravity. The distance the point of draft attachment is from the center to get best results will depend on the steepness of the hill. Consequently in practicing my invention the pins 15 are shifted into certain holes 17, so that when the slide-bar comes against the downhill-pin the draft will be sufficiently below the center as to throw and hold the harrow in proper relation to the line of draft. Reaching the end of the course the team is turned around uphill and the pull on the harrow slackened so the bar 10 can shift lengthwise of bar 2 and bring up against the pin 15 on the opposite end of bar 2, which pin will be downhill when the hill is next traversed. In other words, the draft is automatically shifted whenever necessary. Thus it is seen that I am enabled by means of the slide-bar and the pins and holes to set the harrow very finely, so as always to get the best work no matter how steep the hill is or how often a turn has to be made. The slide-bar also operates to save breakage, as where a tree or fence is encountered by the harrow or by the end of the draft-bar nearest adjacent to the slide-bar, since the obstruction instead of encountering a rigid unyielding resistance will cause the draft-bar to tilt backward, so that the slide-bar will shift automatically to the other end of the draft-bar, letting the harrow slide around the obstruction.

The same device is adaptable to harrows of any width or to single sections of harrows.

Having thus described my invention, what I claim, and desire to secure by Letters Patent, is—

1. The combination with a harrow of a draft-bar connecting to and extending across the top of the harrow, said bar having a double series of perforations, a bar for the attachment of the draft means, guiding means carried by one bar and embracing the other bar, said second bar being slidable lengthwise on the draft-bar, and means to vary the movement of the sliding bar on the draft-bar, said last-named means including pins fitting one of said series of perforations and having lateral projections fitting the perforations of the other series.

2. The combination with a draft-bar, of a member parallel with and supported by the draft-bar for the attachment of a draft means, guiding means between the bars and by which the second bar is slidable on the draft-bar, said draft-bar having a double series of perforations, and pins fitting one of said series of perforations, to limit and vary the sliding movement of said member, said pins having lateral projections with inturned ends fitting the other series of perforations in the draft-bar.

3. The combination of a draft-bar having a double series of perforations, a second bar for the attachment of a draft means, means carried by one bar and engaging the other bar whereby the second bar is slidable lengthwise of a draft-bar, and means to limit said sliding movement, said last-named means including pins fitting one series of perforations and provided with lateral extensions fitting the other series of perforations.

4. The combination of a draft-bar, a sliding bar carried by the draft-bar for the attachment of the draft means, said sliding bar having brackets proximate to its ends embracing the draft-bar, said brackets having reversible bearings on the back of the draft-bar, and means to limit the sliding movement of said sliding bar on the draft-bar.

5. The combination of a draft-bar, a sliding bar carried thereby and to which the draft means is attached, said draft-bar having a plurality of perforations on each side of the center, pins fitting said perforations and limiting the movement of the sliding bar on the draft-bar, said pins having lateral curved projections, and said draft-bar having perforations to receive the ends of said projections to hold said pins against turning.

In testimony whereof I have hereunto set my hand in presence of two subscribing witnesses.

MANUEL C. MACHADO.

Witnesses:
S. H. NOURSE,
HENRY P. TRICOU.